(No Model.)

J. E. BERING.
CORN PLANTER CHECK ROWER.

No. 315,226. Patented Apr. 7, 1885.

Witnesses:
L. R. Richards.
Melville W. Cox.

Inventor:
James Edward Bering,
By W. B. Richards,
Atty.

UNITED STATES PATENT OFFICE.

JAMES EDWARD BERING, OF DECATUR, ILLINOIS.

CORN-PLANTER CHECK-ROWER.

SPECIFICATION forming part of Letters Patent No. 315,226, dated April 7, 1885.

Application filed April 25, 1884. (No model.)

*To all whom it may concern:*

Be it known that I, JAMES EDWARD BERING, a citizen of the United States, residing at Decatur, in the county of Macon and State of Illinois, have invented certain new and useful Improvements in Corn-Planter Check-Rowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planter check-rowers of that class in which a check-row wire or chain stretched across the field is made to operate the seed-dropping mechanism. In the use of check-rowers of this class, before commencing to plant the check-row wire or tappet-wire wound upon a reel is laid or stretched across the field by mounting the reel upon or dragging it behind the planter and fastening its free end to a stake or anchor, so that as the planter is driven across the field the tappet-wire will be paid out and laid in place; and the object of this invention is to provide simple, cheap, and effective means for laying the tappet-wire at a proper tension; and to this end and object my invention consists in the use of a cord or other flexible band wound upon the shaft of the reel and adapted to act as a brake thereon, all as hereinafter fully described and claimed.

Figure 1:
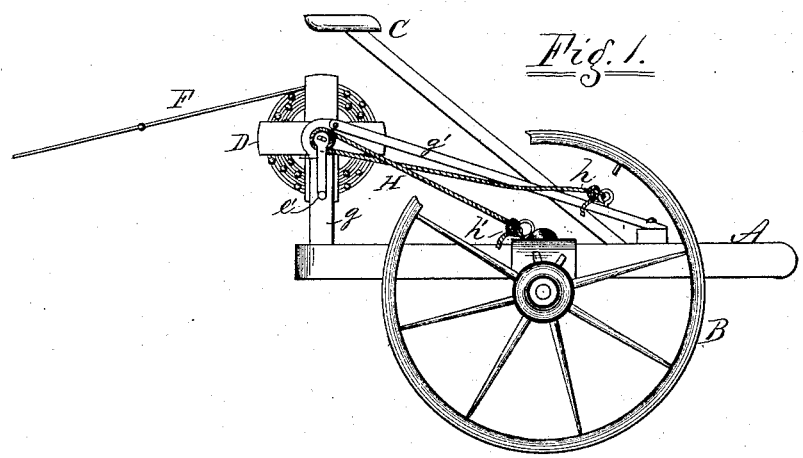
Figure 2:
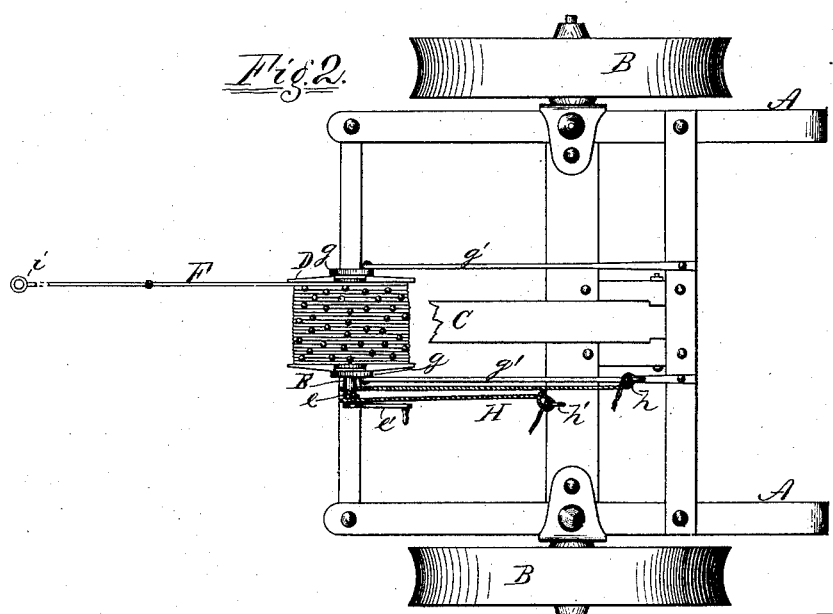

In the accompanying drawings, which illustrate one method of applying the main feature of my invention, Figure 1 is a side elevation of so much as seems necessary to be shown of a corn-planter embracing my invention. Fig. 2 is a top plan of the parts shown at Fig. 1.

Referring to the drawings by letters—the same letter indicating the same part in the different figures—letters A B C represent, respectively, the rear frame, wheels, and driver's seat of an ordinary corn-planter. D is a reel; E, the reel-shaft, with an extended end, $e$, provided with a crank, $e'$, and F is a tappet-wire, all of ordinary construction. The reel-shaft E has suitable bearings in standards $g$, which are supported on the rear of the planter-frame. The standards $g$ are stayed by braces $g'$.

H is the cord-brake, secured at one end, $h$, to a brace, $g'$, its mid-length portion wound on the shaft E, and its other end, $h'$, secured to a part of the frame of the planter.

In laying the tappet-wire its free end is first secured to an ordinary stake or anchor, $i$. Then as the planter is drawn across the field the reel will turn and pay out the wire, and the driver, by placing his foot near the end $h$ thereof and pressing thereon, as required, can regulate the tension of the wire as desired. The ends of the rope-brake may be secured to any part of the frame of the planter, but I prefer securing its end $h$ at some point which will permit the driver placing his foot thereon, or at some point where he can reach it with his hand to operate the brake.

In reeling the tappet-wire from its stretched position on the field, the crank $e'$ may be used to turn the reel and coil the wire thereon as the planter is drawn along the laid part of the wire, or the planter may remain stationary while the reel is turned in the same manner to coil the wire, its free end being first released from the stake or anchor.

Having thus described my invention, what I claim as new, and desire to secure by Letters Patent, is—

In combination, the reel having an extended shaft, $e$, and a crank, $e'$, corn-planter frame and standards $g$, and cord H, wound on the shaft $e$ and secured to the planter-frame, substantially as and for the purpose specified.

In testimony whereof I affix my signature in presence of two witnesses.

JAMES EDWARD BERING.

Witnesses:
 L. BURROWS,
 L. L. BURROWS.